United States Patent
Anderson

[11] 3,803,407
[45] Apr. 9, 1974

[54] NIGHT VIEWING POCKET SCOPE

[75] Inventor: David K. Anderson, Woodbridge, Va.

[73] Assignee: The United States of America as represented by the Secretary of the Army, Washington, D.C.

[22] Filed: Aug. 18, 1972

[21] Appl. No.: 281,681

[52] U.S. Cl. ............ 250/213 VT, 250/227, 250/239
[51] Int. Cl. ......................... G02b 5/14, H01j 31/50
[58] Field of Search .............. 250/213 VT, 227, 239

[56] References Cited
UNITED STATES PATENTS
3,737,667   6/1973   Babb et al...................... 250/213 R
3,400,291   9/1968   Sheldon ......................... 250/227 X

OTHER PUBLICATIONS
Product Data Sheet for Varo Inc. Electronics Product Division's "Infrared Viewer Mini–Scope Model 5500" distributed at IEEE Convention Mar. 25, 1963

Primary Examiner—Archie R. Borchelt
Assistant Examiner—T. N. Grigsby
Attorney, Agent, or Firm—Edward J. Kelly; Herbert Berl; Max L. Harwell

[57] ABSTRACT

An electro-optic pocket scope that provides a highly intensified image of low light level scenes being viewed therethrough. The pocket scope is similar to a simple telescope in that an optical train of elements comprise an objective lens for obtaining the image and a magnifier eye piece to display the scene to the observer's eye. The present scope is different in that photons from the objective lens are focused on a photocathode through collecting fiber optics, are converted into an electron image that is intensified through a microchannel plate, is reproduced as a visual image on a green phosphor screen, is inverted through a fiber optic inverter an is then presented to the magnifier eye piece for observation by an operator. Salient features of this invention are the high amplification of the electron image by the microchannel plate, the high resolution of the visible image through the collecting fiber optics and the fiber optic inverter, and the use of the more efficient green phosphor for the screen. These features increase brightness from the scene being viewed to the observer by a factor of many thousands. The microchannel plate electron multiplier, or amplifier, is the primary gain element of the pocket scope.

The invention described herein may be manufactured, used, and licensed by or for the Government for governmental purposes without the payment to me of any royalty thereon.

6 Claims, 10 Drawing Figures

PATENTED APR 9 1974          3,803,407

MODULATION TRANSFER (PERCENT) vs. SPATIAL FREQUENCY (LINE PAIRS PER MILLIMETER)

SYSTEM MODULATION TRANSFER FUNCTION

MODULATION TRANSFER (PERCENT) vs. FREQUENCY (CYCLES PER MILLIRADIAN)

NIGHT VIEWING POCKET SCOPE

BACKGROUND AND SUMMARY OF THE INVENTION

This invention relates to a night viewing telescope of pocket size. In particular, the invention discloses a device for increasing by a factor of many thousand the brightness of a scene being viewed through the pocket scope. The pocket scope of the present invention is, therefore, ideal for use as a night viewing device.

The present invention comprises a light weight, small size night viewing pocket scope having a train of electro-optic elements. These electro-optic elements comprise an objective lens having an aperture much larger than that of the normal eye, collecting fiber optics that channel the focused photon image from the objective lens onto a photocathode, a microchannel plate electron multiplier in close proximity to the cathode for multiplying electrons emitted from the photocathode surface, a green phosphor screen and fiber optic inverter for converting the electron image back to a visible image and for rotating this image through 180° back to the normal upright image of the scene being viewed, and a magnifier eye piece for magnifying the upright image. A wrap around power supply is used to apply the necessary high bias voltages to the cathode, to the output electrode of the micro-channel plate, and to the screen. The train of electro-optic elements and the power supply are enclosed in a pocket scope housing made of some insulator material.

DESCRIPTION OF THE PREFERRED EMBODIMENT

Figure 1:
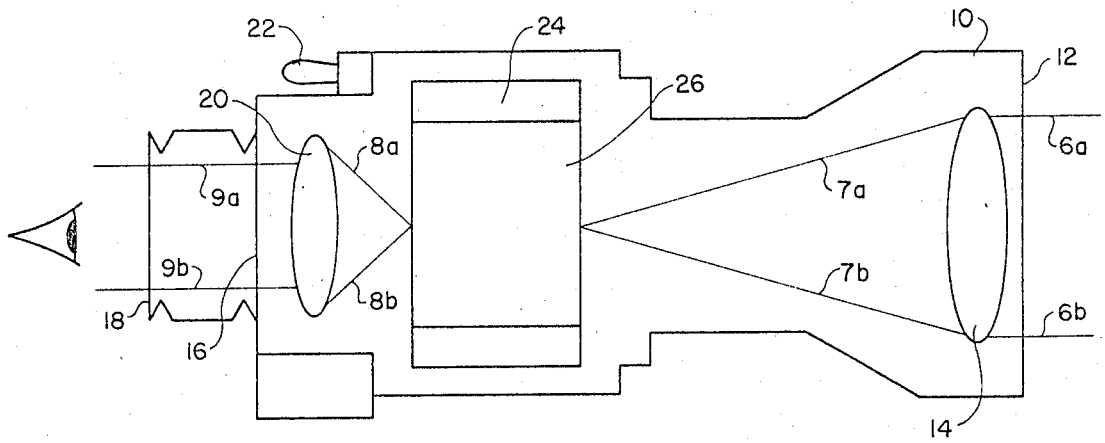
FIG. 1 illustrates a sectional view of the train of electro-optic elements in the night viewing pocket scope.

Referring to FIG. 1, pocket scope housing 10 is shown enclosing the train of electro-optic elements that form a night viewing pocket scope of 18 millimeters diameter. Housing 10 has a transparent front seal for allowing the image from a scene being viewed to pass therethrough to objective lens 14. A transparent rear seal 16 allows an operator to view the image after it has passed through the pocket scope. Seals 12 and 16 are sealed around housing 10 so that the interior of the housing is air tight and moisture proof. An eye shield 18 fits around the eye of an operator when the operator is viewing the image through the night viewing pocket scope. Shield 19 may be made of black rubber that accordians inward toward a magnifier eye piece 20 when the operator presses his eye against 18. A feature of eye shield 18 is that it has a rubber membrane with a vertical cut thereon so that it is closed until the operator presses his eye against the eye shield. A toggle switch 22, positioned on the exterior of housing 10, switches the power supply on for activating the pocket scope. A wrap around power supply 24, encircling the image intensifier 26 for convenience and weight balance of the scope, comprises a direct current battery fed oscillator and voltage regulator circuit that boosts a low voltage from about 2 to 2.7 volts supplied by a small battery to many multiples of that low voltage. The much higher voltage is required for operation of the image intensifier. The values of these higher voltages from power supply 24 are discussed in more detail below.

Figure 2:
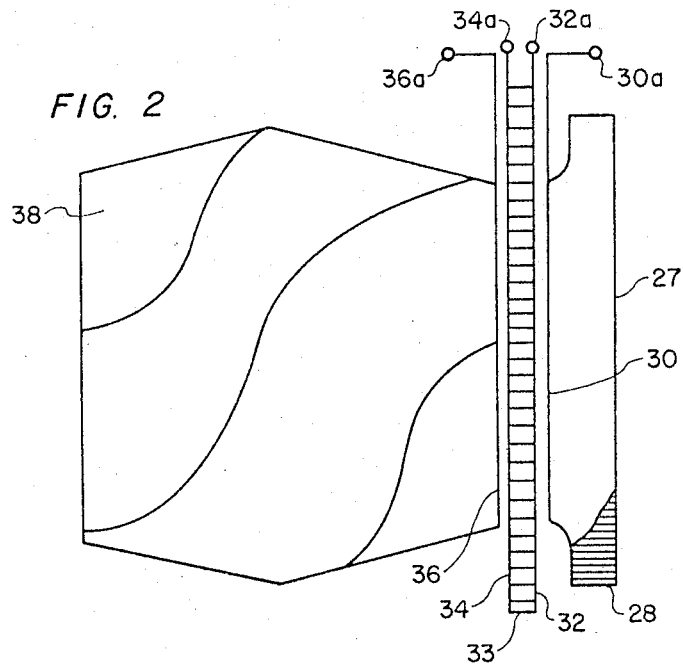
FIG. 2 shows the elements of the microchannel plate image intensifier tube.

Refer now to FIG. 2, along with FIG. 1, for a more detailed discussion. Photons from a scene being viewed, which are represented as beams 6a and 6b, pass through transparent front seal 12 and strike objective lens 14. Objective lens 14 focuses these photons, which are now represented as beams 7a and 7b, onto front face 27 of a wafer of collecting fiber optics 28. The image of these photons pass through collecting fiber optics 28 with high resolution i.e., without spill over from one channel to the other channel. The channels of fiber optics are parallel in 28. The other side of 28 is coated with a suitable photocathode material to form cathode 30. The energy of the photons forming the image on 30 is at very low energy due to the pocket scope being used at nighttime when the light level is low, and thus very few photons are present in beams 6a and 6b. Consequently, not many electrons are emitted from cathode 30 to form an electron image of the scene being viewed by the night viewing pocket scope. Bias voltages for the image intensifier are supplied by the wrap around power supply 24 as stated above. Typical values for the voltages are as follows. The voltage applied at terminal 36a, and connected to screen 36, is about 5,000 direct current volts. The voltage across a microchannel plate electron tube 33 is about 1,000 direct current volts with the 1,000 volts connected to terminal 34a, and thus to output electrode 34, and terminal 32a connected to ground potential. Terminal 32a is connected to input 32. The voltage applied to terminal 30a, which is connected directly to cathode 30, is about 500 negative direct current volts. Voltages of these values multiply the number of electrons emitted from cathode to the number of electrons inpinging on phosphor screen 36 by a factor of more than a thousand.

In operation, the incoming image from the scene represented by 6a and 6b is inverted 180° at the output objective lens 14. This inverted photon image is then converted to an inverted electron image at the output of cathode 30 and on through the microchannel plate 33 to the input of phosphor screen 36. At the output of screen 36 the inverted electron image is converted back to an inverted photon image. Since the photon image at the output of screen 36 is inverted 180° from the original scene, a fiber optic inverter 38 is connected to the output of screen 36 for inverting this image through another 180°, or back to the original position. Inverter 38 rotates the image within a 19 millimeter distance. The much magnified image at the output of screen 36 and at the output of fiber optic inverter 38 is projected onto magnifier eye piece 20. The outer edges of the photon image from 38 to eye piece 20 is designated as 8a and 8b. The magnified image at the output of 20, indicated by lines 9 a and 9b, is viewed directly by an operator. A feature of shield 18 is that until the enclosure is pressed forward by an operator pressing his eye and the surrounding area of his face against 18 the transparent rear seal 16 is shielded by the rubber membrane within shield 18.

Figure 3:
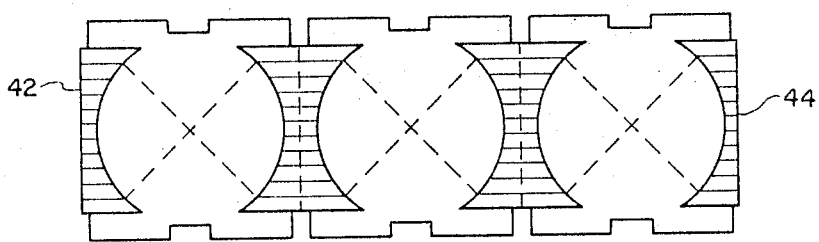
FIG. 3 shows a prior art three stage electron acceleration image intensifier used in previous direct view night vision devices.

FIG. 3 shows the prior art three stage electron acceleration image intensifier used in a larger starlight scope. There has to be an off multiple of stages for the inverted image from an objective lens (not shown) coming in at face 42 to be turned upright at the output face 44. In the case of this prior art electron acceleration image intensifier, the three stages of amplification are needed to provide the required amplification of the image. The microchannel plate electron amplifier of the present invention, used with the large voltages applied to the cathode, the screen, and the output electrode of the microchannel plate, are far superior in resolution to this prior art electron acceleration image intensifier. Also, the present night viewing scope can be made so much shorter in length that it can be transported in an ordinary size pocket. Another important feature of the present invention over the prior art starlight scope is that blooming of the light is almost entirely eliminated. One reason for the elimination of blooming is that only one microchannel amplifier stage is used. The depth of the channels in the microchannel are at an optimum length to diameter ratio of, say 40 to 50, with the diameter of an individual channel being 12 microns inside diameter. Conversely, the three stage electron acceleration image intensifier has electron image spill over from one group of fiber optics to each subsequent group of fiber optics connecting each of the three stages. This spill over is cumulative for the three stages.

Figure 4:
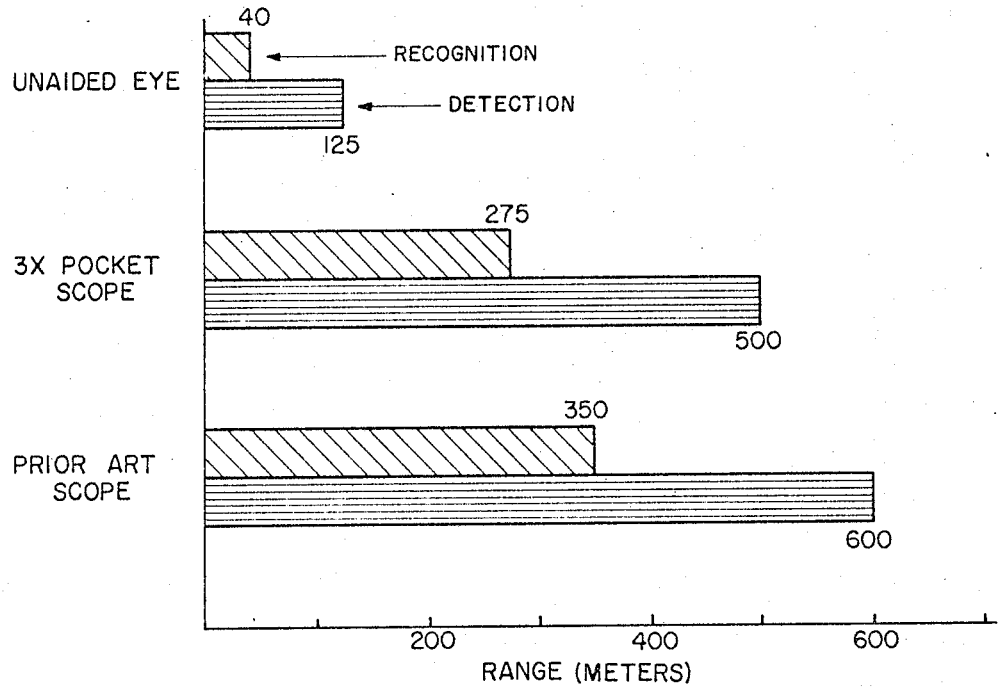
FIG. 4 illustrates by bar graphs the range of detection and recognition by the unaided eye, by a prior art scope, and by the present pocket scope.

FIG. 4 shows by bar graph the detection and recognition distances in meters of a man in an environment of trees and fields of medium clutter when the light level of the scene is $1.0 \times 10^{-4}$ foot-candles. This is merely a comparison of the unaided eye versus the prior art starlight scope and versus the present three power night viewing pocket scope. At first look at FIG. 4 it might be thought that the three power pocket scope would be disadvantageous. Even though there is a sacrifice in the distance that the pocket scope can be viewed, the pocket scope has much better resolution and the requirements are different. That is, the small, hand held pocket scope offers a potential for many more surveillance roles than that of the larger starlight scope.

Figure 5:
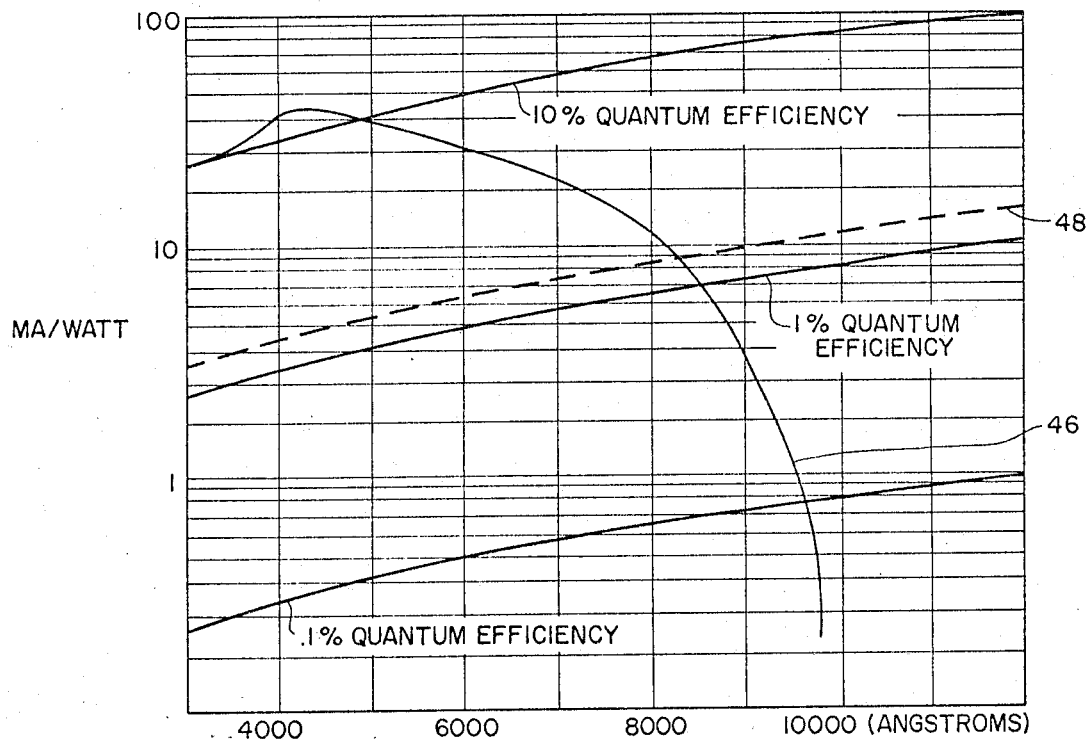
FIG. 5 shows curves of quantum efficiency of the cathode as a function of wavelength.

FIG. 5 illustrates the effective bandpass of the cathode used in the present night viewing pocket scope. The abscissa of the graph shows the amount of current off the cathode per light energy into the cathode in milliamperes per watt. Curve 46 shows the bandpass limit which drops off sharply at the wave lengths over 9,000 angstroms. Three quantum efficiency lines are also plotted on the graph. One is at 0.1 percent efficiency; a second is at 1 percent efficiency; and another is at 10 percent efficiency. The quantum efficiency of a normal eye is about 2 percent as a comparison of the bandpass of the cathode. The 2 percent quantum efficiency is shown as dashed curve 48. The vision of a normal eye then would intersect the bandpass curve 48 at the wavelength of about 8,200 angstroms. The eye is not capable of seeing at wavelengths larger that 7,000 angstroms, therefore, the 8,200 angstroms is above cutoff. Cathode 30 of the present invention, therefore, extends the bandpass further than the normal eye would see. Cathode 30 is a S–20 which is a mixture of sodium, potassium, cesium, and antimony. This mixture is deposited on one side of the collecting fiber optics 28 in a vacuum environment.

Figure 6:
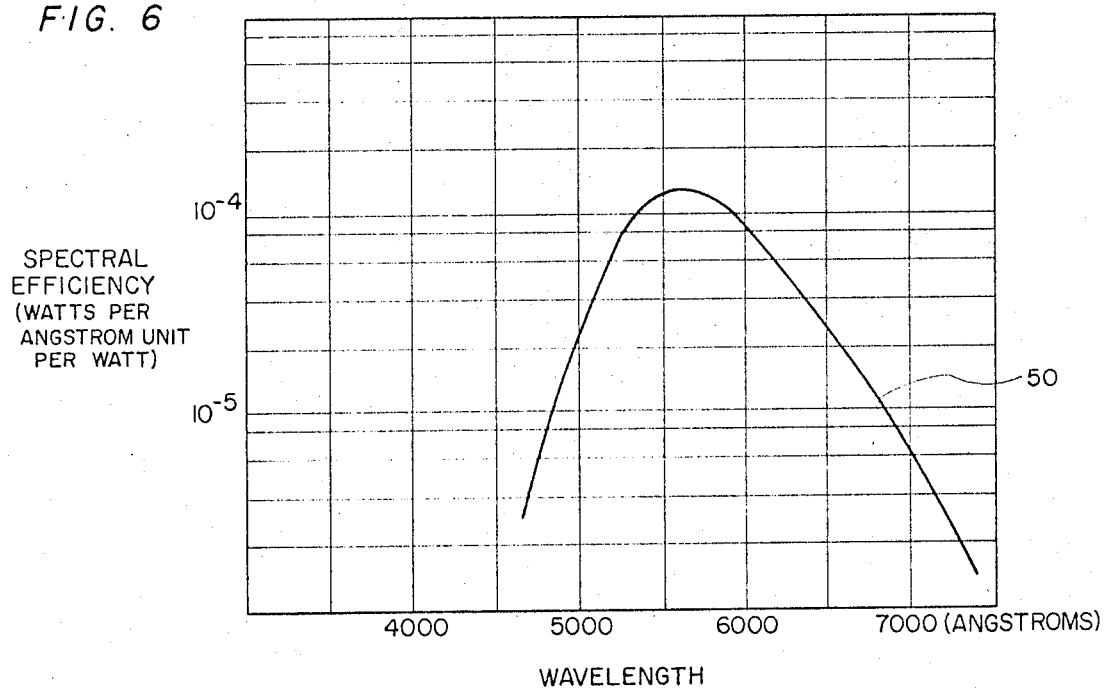
FIG. 6 shows the curve of spectral efficiency for the phosphor screen.

FIG. 6 shows a graph of a spectral curve 50 representative of a green colored phosphor screen 36 that is used in the present invention. In this graph the abscissa shows the wavelength in angstroms, and the ordinate shows spectral efficiency in light watts input per angstrom unit per watt output. The output wavelengths of 5,000 to 7,000 angstroms is in the visible region of the spectrum. The phosphor screen may be deposited on one side of the fiber optic inverter by simply lowering the inerter in contact with a green settled liquid solution. Phosphor 36 is made of zinc, cadmium sulphide, and silver.

Figure 7:
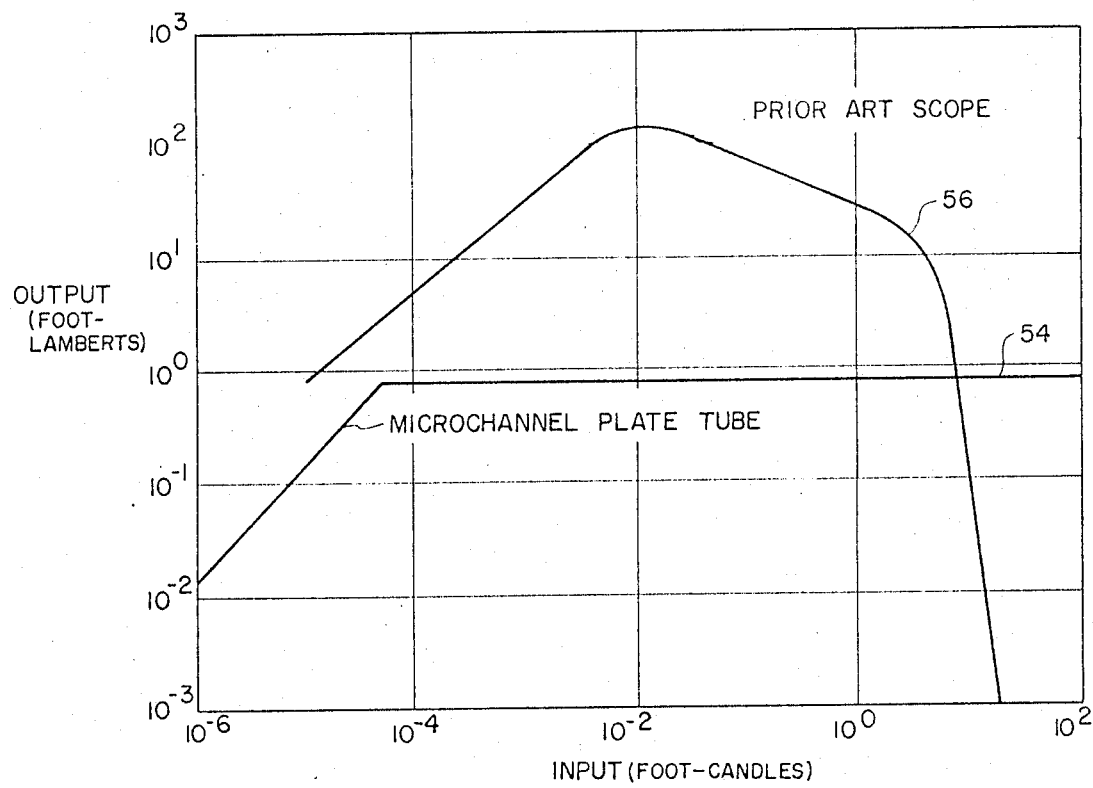
FIG. 7 compares by illustrative curves the system light outputs of the three stage electron multiplier with that of the microchannel plate tube.

FIG. 7 illustrates the light levels of the prior art three stage electron multiplier starlight scope and the present microchannel electron multiplier pocket scope with the input light level in foot-candles as the abscissa and the output light level in foot-lamberts as an ordinate. These light levels represent the input light level of the scene being viewed, as imaged in the input to the pocket scope, and the output light level to an operator. Curve 56 shows the undesirable large variation of the output light with input light. The advantage of the flat response, shown as curve 54, of the present night viewing pocket scope for increased light input, such as a sudden increase of input by auto headlights, is quite obvious. The upper end of the light level input at about $10^2$ foot-candles input (about the light level of a well lighted room), therefore, does not affect the output of the present night viewing pocket scope but completely saturates the prior starlight scope using the three stage electron multiplier. Even though the screen brightness of the present night viewing pocket scope is less than the prior art starlight scope in the range from about $10^{-5}$ to 40 foot-candles, thus causing a slight decrease in search effectiveness, the observer regains his natural scotopic vision much faster. The wrap around power supply mentioned above has a feedback system from the screen to the oscillator within the power supply such that increased current in the screen caused by increased brightness of the screen lowers the bias voltages, thus automatically maintaining the screen at a constant light level when the input light to the tube is as much as $10^{-4}$ foot-candles or more. Also, the microchannel has a basic saturation curve as a function of light input level. The microchannel saturation is a localized effect in that each channel of the microchannel plate operates essentially independent of each other. Although there is a small amount of cross talk, this localized saturation greatly aids in improving "whiteout" image blooming that severely affects the prior art starlight scope using the three stage electron multiplier where the blooming is cumulative from one stage to the subsequent stage.

Figure 8:
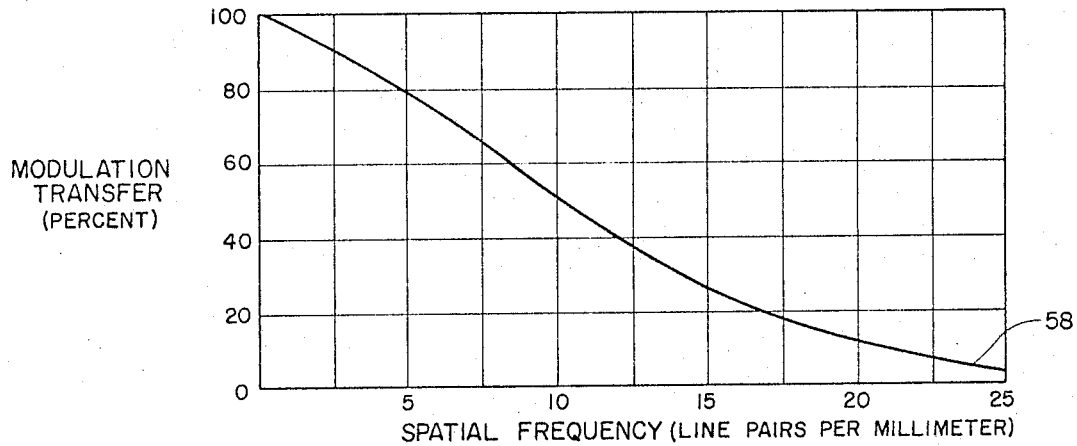
FIG. 8 shows the microchannel plate tube modulation transfer function in line pairs per millimeter.

FIG. 8 illustrates a curve 58 that represents the percent modulation transfer through the microchannel electron multiplier to be in line pairs per millimeter. The limiting factor is the diameter of the channels of the microchannel plate since typically the diameter is 12 microns. Curve 58 is presented to illustrate the resolution capabilities of the tube.

Figure 9:
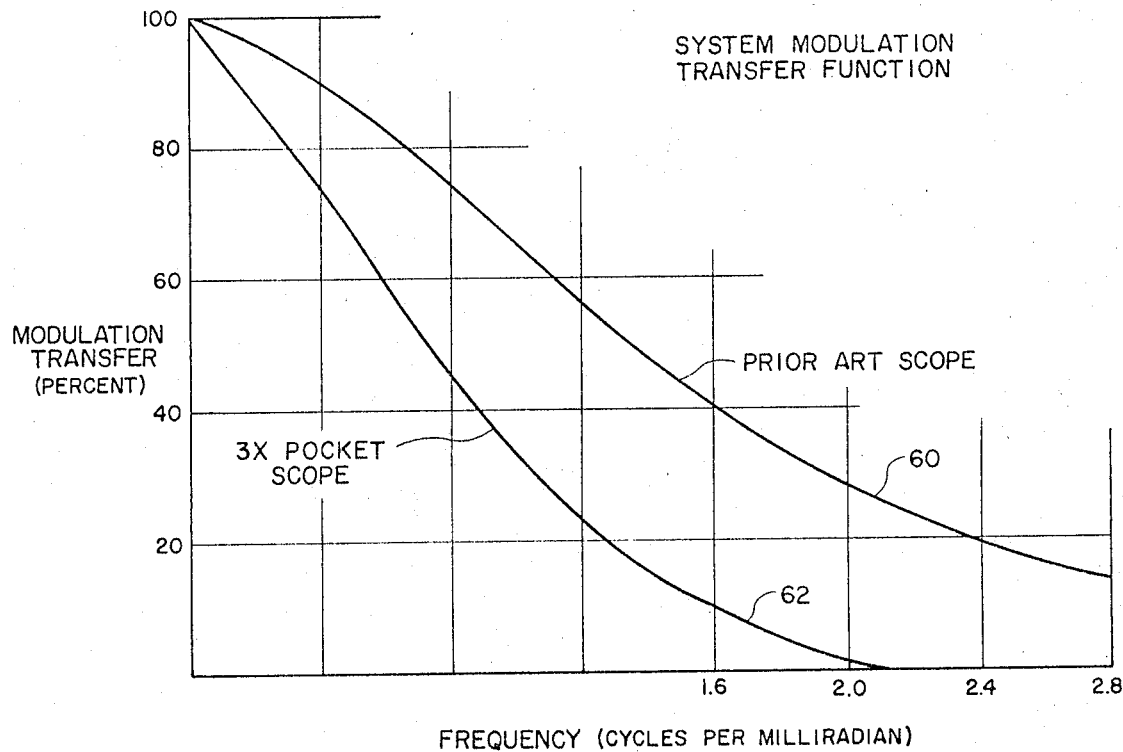
FIG. 9 illustrates the system modulation transfer function for the pocket scope versus a prior art starlight scope.
Figure 10:
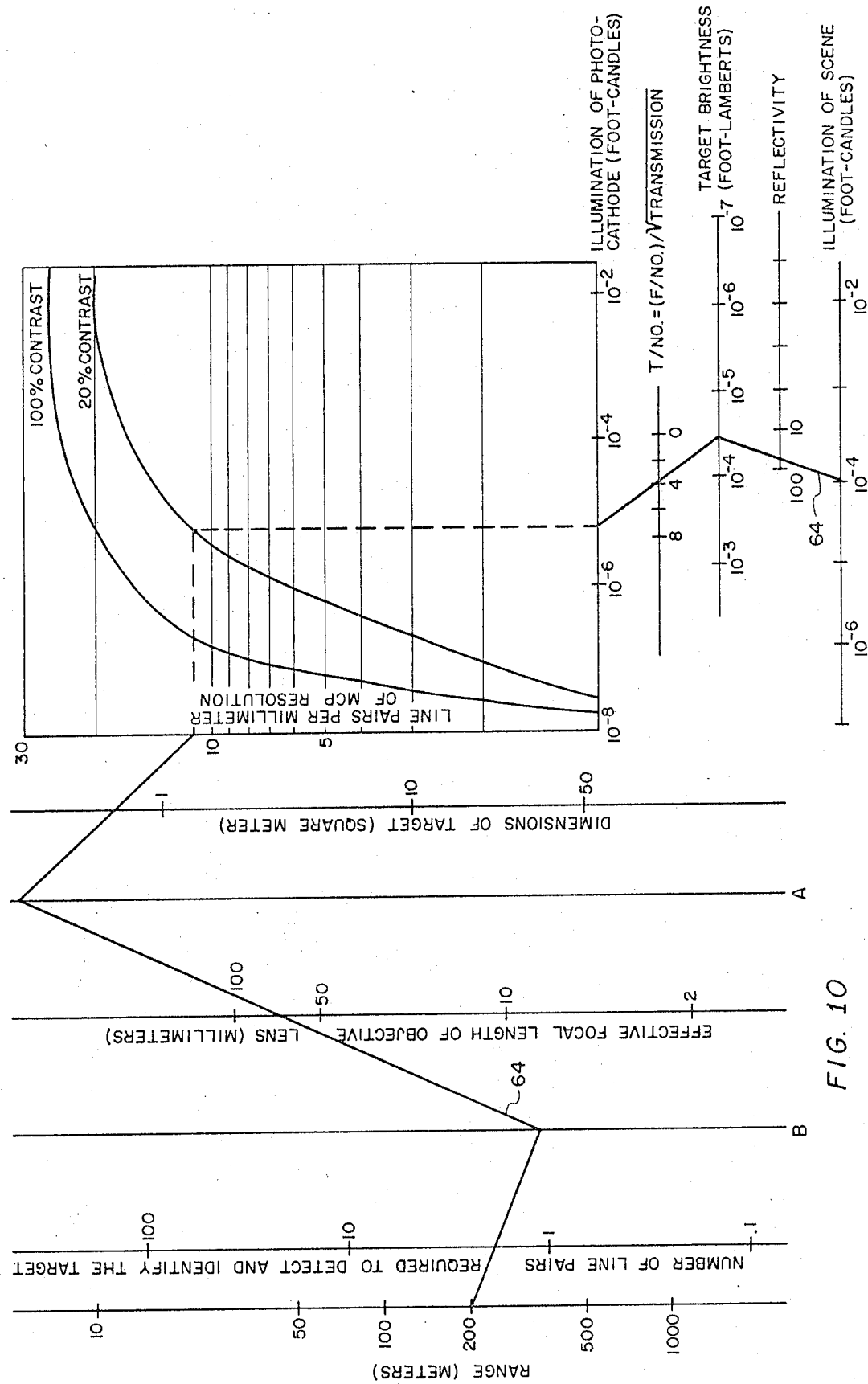
FIG. 10 shows a nomograph representing the dependence of detection range on the objective lens and tube parameters.

FIG. 9 illustrates the entire systems modulation transfer function this time with the abscissa of the graph representing cycles per milliradian and includes the objective lens modulation transfer, the microchannel tube modulation transfer, the magnifier eye piece modulation transfer, and the fiber optics modulation transfer. Typical pocket scope performance characteristics of the cathode are, for example, as follows. There are 320 microamperes per lumen cathode sensitivity, 10,000 brightness gain, and 5.0 signal to noise ratio. The overall system optical power, field of view, and range performance are determined by the choice of eye piece lens, objective lens, and tube performance. Curve 60 shows the system modulation transfer function of the starlight scope. Features of this starlight scope has an objective lens with an effective focal length of 135 millimeters. The dependence of detection range on the objective lens and other scope parameters are shown in the nomagraph of FIG. 10 and explained hereinbelow. Curve 62 shows the system modulation transfer function of the present night viewing pocket scope. Features of the pocket scope are that the objective lens has a 72 millimeter effective focal length refractive lens and the magnifier eye piece has a 27 millimeter effective focal length. With this combination of lenses, a 2.67 optical power device is provided.

Like all vision aids the range of the pocket scope is also a function of target size, target contrast, reflectivity, atmospheric transmission contrast, and line of sight. The tradeoff of range for field of view is exemplified by two different size night viewing pocket scopes, namely the three power and one power, in Table 1 below. Obviously, the size of pocket scope used depends on the particular needs of the operator in range and search effectiveness. Both size pocket scopes have been fired on small arms weapons and are found to withstand at least 80 g's. Other features of the two scopes are shown in Table 1.

TABLE 1

| | One Power Pocket Scope | Three Power Pocket Scope |
|---|---|---|
| Size | 4.5 inches | 7 inches |
| Weight | 1.0 pounds | 1.5 pounds |
| Field of View | 40° | 15° |
| Recognition Range | 100 meters (nominal) | 275 meters (nominal) |
| System Magnification | 1X | 2.67X |
| Objective Lens Effective Focal Length | 27 millimeters | 72 millimeters |

FIG. 10 shows a range nomagraph illustrated by a line 64 starting on the right side and proceeding through typical characteristics of the scene being viewed, of the pocket scope characteristics, and on to the predicted range of the scope in meters for detection and recognition of the object being viewed. Line 64 starts at a scene of $10^{-4}$ foot-candles illumination, which is typically the illumination of a star lighted nighttime scene. Line 64 proceeds through a reflective line representation and on to a target brightness scale of between $10^{-4}$ and $10^{-5}$ foot-lamberts target brightness. Assuming the T/number of objective lens 14 is a value of 4, line 64 will intersect the photocathode input illumination level of about $10^{-5}$ foot-candles, which represents an illumination loss from the scene being viewed to the input of cathode 30 of about $10^{-1}$ foot-candles. With an input illumination level of $10^{-5}$ foot-candles at cathode 30, and a target contrast of 20 percent the line pairs per millimeter for the microchannel plate resolution is about 12. Next, line 64 is projected through a scale representing less than one square meter target dimension, such as the dimension of the soldier, to a guide line A. A scale representing the effective focal length of the objective lens is positioned between guide line A and another guide line B. Line 64 is projected through a typical effective focal length of about 70 millimeters for the objective lens. A scale of the number of line pairs required to detect and identify the target, such as two or three line pairs required to identify a soldier, is positioned between guide line B and the final predicated range scale. Using typical values as set forth herein, a soldier can be identified at 200 meters.

I claim:

1. A night viewing pocket scope having an optical train of elements comprising:

an objective lens for obtaining an image of a nighttime scene and providing a focused image therefrom;

collecting fiber optics positioned in the focal path adjacent said objective lens;

a cathode layer deposited on the side of said collecting fiber optics that is opposite said objective lens, said cathode ejecting electrons therefrom according to said focused image;

a microchannel plate electron multiplier tube having an input electrode adjacent said cathode layer and an output electrode on the opposite side of said microchannel plate electron multiplier tube, said tube used for multiplying the electron ejected from said cathode;

a fiber optic inverter positioned adjacent said output electrode;

a phosphor screen layer deposited on the side of said fiber optic inverter adjacent said output electrode for receiving electrons emitted from said tube and providing a luminescent image therefrom wherein said fiber optic inverter turns said luminescent image through 180°;

a direct current power supply for furnishing operating voltages to said cathode, tube, and phosphor screen; and a magnifier eye piece for viewing said luminescent image.

2. A night viewing pocket scope as set forth in claim 1 wherein said night viewing pocket scope is 18 millimeters in diameter.

3. A night viewing pocket scope as set forth in claim 1 wherein said magnifier eye piece has a magnification power in the range from 10 to 14.

4. A night viewing pocket scope as set forth in claim 1 wherein said phosphor screen is made of green material.

5. A night viewing pocket scope as set forth in claim 1 wherein said cathode is made of a mixture of sodium, potassium, cesium, and antimony.

6. A night viewing pocket scope as set forth in claim 1 wherein said phosphor screen is made of a mixture of zinc, cadmium sulphide, and silver.

* * * * *